June 27, 1961
T. R. O'MEARA ET AL
2,990,524
PULSE MODULATOR HAVING IMPROVED RING NEUTRALIZED
TRANSFORMER COUPLING NETWORK
Filed Feb. 1, 1960
3 Sheets-Sheet 1
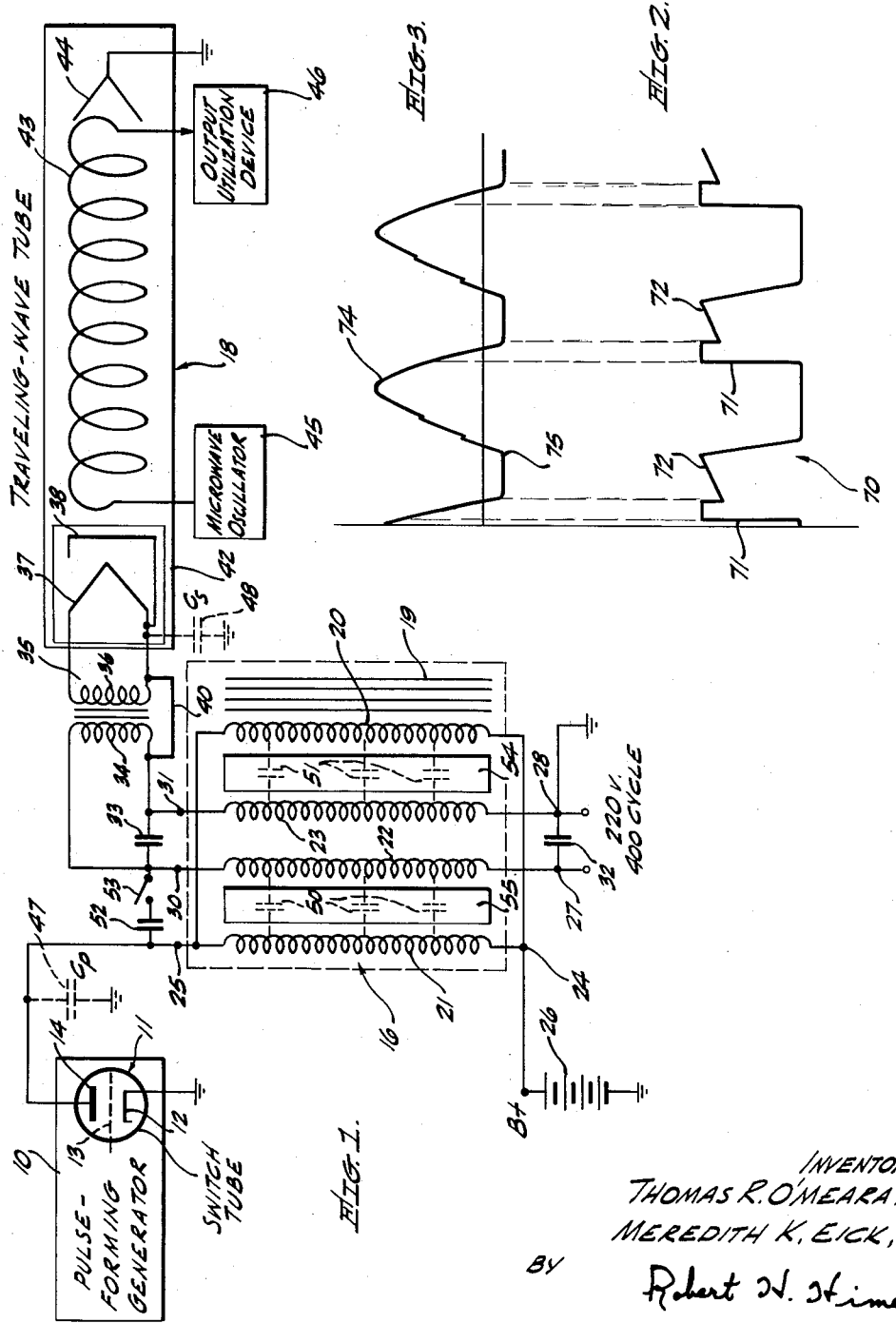
INVENTORS.
THOMAS R. O'MEARA,
MEREDITH K. EICK,
BY Robert N. Himes
ATTORNEY.

INVENTORS.
THOMAS R. O'MEARA,
MEREDITH K. EICK,
BY
Robert H. Himes
ATTORNEY

INVENTORS.
THOMAS R. O'MEARA,
MEREDITH K. EICK,
BY Robert N. Nimes
ATTORNEY

United States Patent Office 2,990,524
Patented June 27, 1961

2,990,524
PULSE MODULATOR HAVING IMPROVED RING NEUTRALIZED TRANSFORMER COUPLING NETWORK
Thomas R. O'Meara, Los Angeles, and Meredith K. Eick, Gardena, Calif., assignors to Hughes Aircraft Company, Culver City, Calif., a corporation of Delaware
Filed Feb. 1, 1960, Ser. No. 6,061
7 Claims. (Cl. 333—24)

This invention relates to pulse modulators and, more particularly, to a pulse modulator including a transformer wherein capacitance is introduced between the primary and secondary windings thereof in a manner to eliminate or "neutralize" ringing components in the output waveform.

A common problem in radar modulators is to step a voltage upwards from a plate voltage swing which is limited by a fixed power supply voltage to higher voltages which may be required for the operation of a microwave device such as a klystron or a traveling-wave tube. The power outputs of these microwave devices are generally extremely sensitive to small variations in the pulse top voltage. Consequently, it is desired that the pulse top voltage be as flat as reasonably possible. Unfortunately, however, with step-up pulse transformers, flat pulses are the exception rather than the rule. Ringing in the primary winding of the transformer results from an excitation of high frequency resonances of the pulse transformers by pulse train frequency components at the anti-resonant frequency of the transformer leakage inductance acting in conjunction with the shunt capacitances of the primary and secondary windings. The resultant ringing in the plate voltage waveform is inverted and transferred by normal network and transformer coupling to the secondary winding thereof though typically at a reduced magnitude because of additional capacitance to ground on the secondary side of the transformer. The more nearly the switch tube employed functions as a constant current device, the less damping effect it will have on the ringing and the worse the ringing will generally become.

It is therefore an object of the present invention to provide an improved pulse modulator apparatus.

Another object of the present invention is to provide a pulse modulator apparatus including a neutralized transformer coupling network.

Still another object of the present invention is to provide an improved pulse transformer having a minimum of secondary winding capacitance to ground.

A further object of the present invention is to provide a pulse modulator apparatus including a pulse transformer having a primary to secondary winding capacitance of a value adapted to neutralize ringing in the secondary winding thereof.

In accordance with the present invention, the ringing component in the secondary waveform of a pulse transformer of a pulse modulator apparatus is "neutralized" or eliminated by introducing an appropriate value of capacitance between the primary and secondary windings of the transformer. This may be accomplished either externally or internally. In addition, the secondary winding capacitance to ground is minimized by completely embedding the secondary winding in the primary winding of the transformer.

The above-mentioned and other features and object of this invention and the manner of obtaining them will be more apparent by reference to the following description taken in conjunction with the accompanying drawings, wherein:

FIGURE 1 is a schematic circuit diagram of the pulse modulator apparatus of the present invention;

FIGS. 2 and 3 are waveforms of voltages in the apparatus of FIG. 1 when ringing is neutralized in both the primary and secondary windings;

Figure 4:
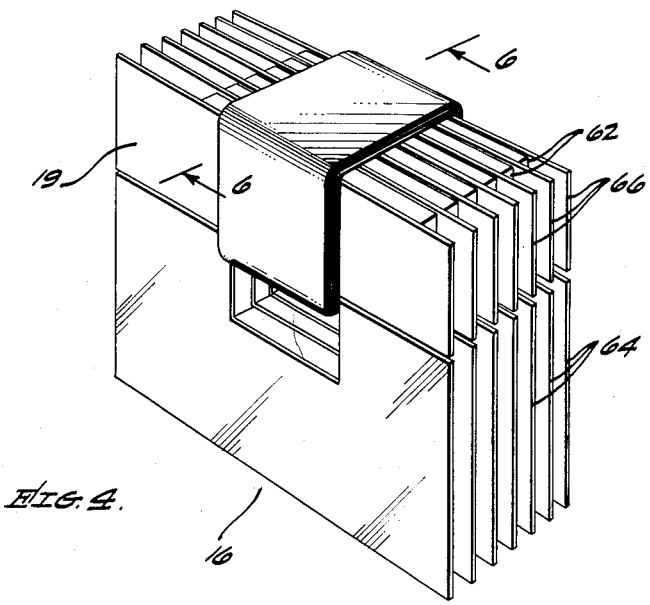
FIGS. 4, 5 and 6 are perspective and sectional views of the pulse transformer in the apparatus of FIG. 1.

Referring now to FIG. 1 of the drawings, there is illustrated a schematic circuit diagram of a representative embodiment of a pulse modulator apparatus incorporating a transformer coupling in accordance with the present invention.

In particular, the pulse modulator apparatus comprises a pulse forming generator 10, including a switch tube 11 having a cathode 12, a control grid 13 and a plate 14, the cathode 12 normally being connected to ground and the plate 14 being coupled through a pulse transformer 16 to an output microwave utilization device 18 which, by way of example, may be a traveling-wave tube. The pulse transformer 16 has a core 19, primary windings 20, 21 wound about the core 19, and secondary windings 22, 23 interposed between the primary windings 20, 21, thereby to minimize the capacitance from the secondary windings 22, 23 to the core 19 and the housing, if any, which elements are generally at ground potential. The primary windings 20, 21 both have their corresponding extremities connected to input terminals 24, 25, whereby they are connected in parallel. Direct-current potential is applied to the switch tube 11 by connecting the terminal 24 to a source 26 of B+ potential and the terminal 25 directly to the plate 14 of switch tube 11. The secondary windings 22, 23 have the extremities thereof nearest the terminal 24 brought out, respectively, to terminals 27, 28 and the remaining extremities to terminals 30, 31. The secondary windings 22, 23 are effectively connected in parallel for the higher frequencies by connecting a capacitor 32 between the terminals 27, 28 and by connecting a capacitor 33 between the terminals 30, 31. The capacitors 32, 33 are of sufficient capacitance so as to present a comparatively high impedance to low frequency signals, i.e., to signals below 400 cycles, and to present a comparatively low impedance to higher frequency signals, i.e., to signals of frequencies greater than one kilocycle. Further, the extremities of secondary windings 22, 23 connected to terminals 27, 28 are referenced to ground by a connection from the terminal 28 to ground.

The output of the pulse transformer 16 is coupled to the traveling-wave tube 18 by connecting the terminals 30, 31 of secondary windings 22, 23, respectively, across the primary winding 34 of a filament transformer 35, the secondary winding 36 of which is connected across the heater 37 of a cathode 38 which is included in an electron gun 42 of the traveling-wave tube 18. The filament transformer 35 is by-passed by connecting extremities of primary and secondary windings 34, 36 thereof that have a common polarity together with a lead 40. The filament 37 of cathode 38 is energized by applying a 220 volt 400 cycle potential across the terminals 27, 28 of pulse transformer 16. When the cathode 38 is energized with a negative pulse of proper magnitude from the pulse transformer 16, the electron gun 42 of the traveling-wave tube 18 is adapted to direct a stream of electrons along a helix 43 to a collector 44 which is connected to ground. A microwave oscillator 45 is coupled to the extremity of the helix 43 nearest the electron gun 42 and applies a microwave signal thereto which it is desired to amplify.

The remaining extremity of the helix 43 is coupled to an output utilization device 46. When the velocity of the electron stream as determined by the amplitude of the pulse applied to cathode 38 is slightly greater than the velocity at which the helix 43 propagates the microwave signal, the signal will be amplified. Since the entire range of velocities through which the electron stream interacts with the electromagnetic wave propagated by the helix 43 is comparatively small, it is evident that any ringing on the top of the applied pulses will affect the velocity of the electron stream and, hence, greatly affect the gain, phase modulation and/or frequency modulation characteristics of the traveling-wave tube 18. It is, of course, evident that the use of other equivalent devices such as klystrons or magnetrons are well within the scope of the teachings of the present disclosure.

In accordance with the present invention, the ringing on top of the voltage pulses applied to cathode 38 of traveling-wave tube 18 is minimized or eliminated. In order to practice the invention, it is necessary to know the distributed capacitance to ground of the plate 14 of switch tube 11 together with the effective capacitance to ground of the primary windings 20, 21 of the pulse transformer 16. This capacitance will be defined as $C_p$ and will be indicated schematically by the dashed-line capacitor 47 connected from the high side of the primary windings 20, 21 to ground. Secondly, under circumstances which will be hereinafter explained, it is necessary to know the effective capacitance to ground of the secondary windings 22, 23 of pulse transformer 16 together with the capacitance to ground of the filament transformer 35 and the capacitance to ground of the input of the traveling-wave tube 18. This total capacitance is represented as $C_s$ and is represented by the dashed-line capacitor 48 which is connected from the cathode 38, which is the element of the traveling-wave tube 18 to which the voltage pulse is applied. Lastly, the effective capacitance between the primary windings 20, 21 and the secondary windings 22, 23 of the pulse transformer 16 is represented by the dashed-line capacitors 50 between windings 21, 22 and by the dashed-line capacitors 51 between the windings 20, 23. The total effective capacitance of the capacitors 50, 51 is $C_{ps}$ and is composed of the sum of the capacitances of the capacitors 50 and 51 plus any additional padding capacitance which is placed between the primary windings 20, 21 and secondary windings 22, 23. In accordance with the present invention, it is necessary that $$C_p = (n-1)C_{ps} \quad (1)$$

wherein "$n$" is the turns ratio, i.e., the average number of turns of the secondary windings 22, 23 divided by the average number of turns of the primary windings 20, 21.

The capacitance $C_{ps}$ may be made equal to the above desired total capacitance by connecting a padding capacitor 52 from the terminal 25 through a single contact switch 53 to terminal 30 of pulse transformer 16. Alternatively, the capacitance $C_{ps}$ may be realized by designing it directly into the pulse transformer 16. In this latter instance, the switch 53 is left in the open-circuit position so as to disconnect capacitor 52, and a pad 54 is interposed between the primary winding 20 and secondary winding 23 and an additional pad 55 interposed between primary winding 21 and secondary winding 22, as shown in the drawing. The pads 54, 55 may be composed of any appropriate dielectric material such as, for example, etched polytetrafluoroethylene which is known commercially as "Teflon."

An actual example of a pulse transformer 16 designed to specific specifications for operation is a pulse-doppler radar system with a duty cycle of from 30 to 50 percent is described in connection with FIGS. 4, 5 and 6. Referring now to the drawings, the primary windings 20, 21 each constitute 50 turns of No. 26 gauge copper wire suitably insulated. The secondary windings 22, 23 are interposed between the primary windings 20, 21 and each constitute 85 turns of No. 31 gauge copper wire to produce an effective step-up turns ratio, $n$, of 1.7. In the particular apparatus in which the described pulse transformer 16 is employed, the capacitance of the plate 14 of switch tube 11 to ground is approximately 22 micromicrofarads and the effective capacitance of the primary windings 20, 21 to ground is approximately 7 micromicrofarads, whereby capacitance $C_p$ is 29 micromicrofarads. Therefore, according to the Relation 1

$$C_{ps} = \frac{29\mu\mu f}{(n-1)} = \frac{29}{1.7-1} = 42\mu\mu f \text{ effective capacitance}$$

As previously specified, this is the total effective capacitance between the primary windings 20, 21 and secondary windings 22, 23, respectively. In dividing the capacitance, the thickness of the dielectric plate between the windings may be maintained uniform, in which case the capacitance between the outer windings 21, 22 will be slightly larger than the capacitance of the inner windings 20, 23 because the area will be slightly larger. In addition, it is evident that in operation, the potential difference between the windings 20, 21 and 22, 23 commences from zero at the extremities connected to the terminals 24, 27, 28 and builds up to a maximum at the extremities connected to the terminals 25, 30, 31. This being the case, it is apparent that the formula for static capacitance cannot be used directly in determining the capacitance between the respective windings. On the other hand, if the potential between the windings increased linearly, the effective capacitance therebetween would be one-third the static capacitance. On the other hand, if a one-quarter cycle increasing potential difference is assumed, the effective capacitance between the windings is one-half the static capacitance. Experience has found, however, that the increase in potential differences is between the linear and sinusoidal increase whereby a factor of approximately 0.4 is more appropriately applied to the static capacitance to produce an approximate value of effective capacitance. Thus, in the instant case, the desired static capacitance is $$\frac{42\mu\mu f}{.4} = 105\mu\mu f$$

which is divided between the windings 21, 22, and 20, 23. In the instant case where etched polytetrafluoroethylene tape is employed, the pads 50 and 51 may be fabricated by using 8 turns of etched polytetrafluoroethylene tape 5 mils thick making a total thickess of 40 mils. The outer and inner sides of primary windings 20, 21 are also appropriately insulated for the high voltages generated.

Figure 6:
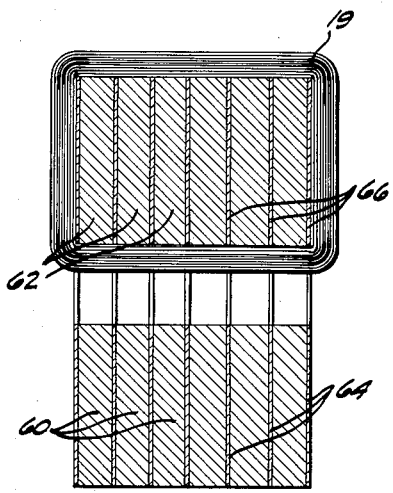
Figure 5:
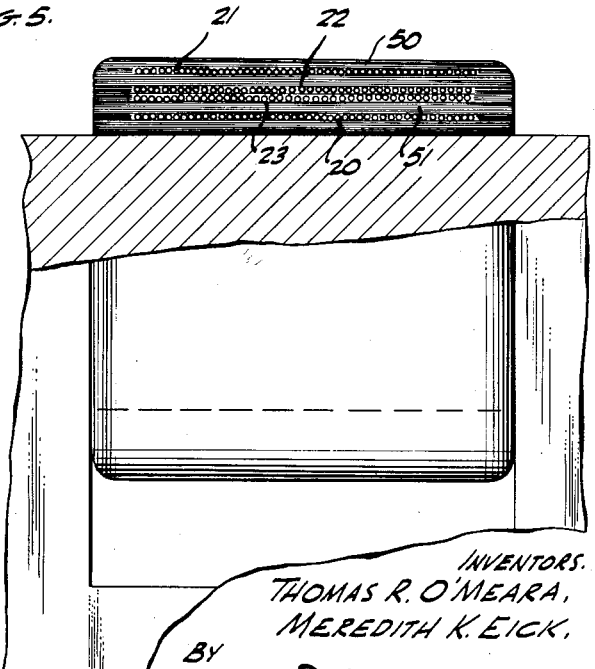

In addition to the above, the pulse transformer described in connection with FIGS. 4, 5 and 6 is designed to operate at a duty cycle of the order of 50%. Ordinary ferrous materials have a reasonably high conductivity and, accordingly, have a substantial amount of eddy-current loss when used to provide the core of a transformer of the instant type. In order to minimize this energy loss, a plurality of ferrite C-shaped slabs 60 and straight ferrite slabs 62 were used to form the core 19. A ferrite found suitable for this purpose is known commercially as "Allen Bradley WO-4" ferrite. The advantage of using a ferrite as a core material is that it has a much higher resistance and, hence, dissipates far less heat in operation. Even so, ferrite material is a poorer conductor of heat than most ferrous materials. Hence, in order to conduct heat that is generated in the slabs 60, 62, away from the slabs 60 and 62, they are separated by copper sheets 64, 66, respectively. It is desirable that the copper sheets 64, 66 be insulated electrically from the ferrite slabs 60, 62 so as not to short out the eddy-current paths and, in addition, to extend past the extremities of the ferrite slabs 60, 62 so that substantial areas of the copper sheet are immersed in the coolant which is generally allowed to circulate over the transformer 16 during its operation.

Figure 7:
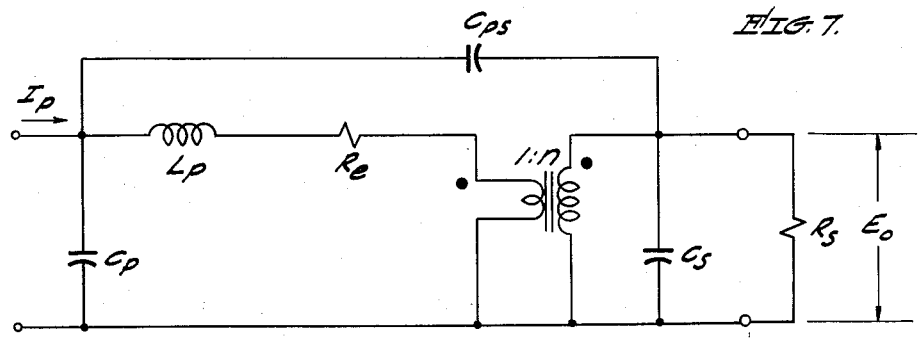
FIGS. 7 and 8 are equivalent circuits of the pulse transformer of FIG. 4.
Figure 8:
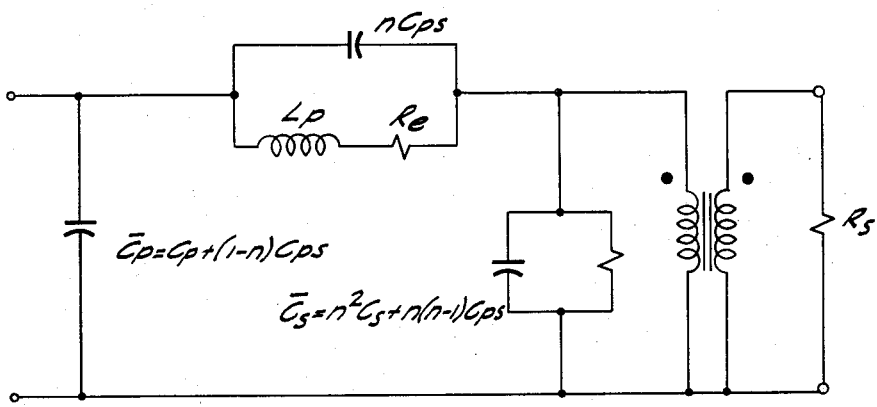

In order to understand how the neutralization in accordance with the present invention functions, one must consider the action of the pulse transformer 16 in more detail as illustrated in FIG. 7. In this figure, as before, $C_{ps}$ is the effective primary to secondary winding capacitance; $C_p$ is the combined primary to ground capacitance of the switch tube 11 and the pulse transformer 16 while $C_s$ is the combined secondary winding to ground capacitance; the parameter $L_p$ is the leakage inductance referenced to the primary side of the transformer 16; $R_e$ is the equivalent resistance of the primary and secondary windings referenced to the primary side; $R_s$ is the effective resistance of the load; and $n$ is the step-up turns ratio of the transformer 16. It may be shown that the network of FIG. 7 is equivalent to the network shown in FIG. 8 and observed that the input primary capacitance is $\bar{C}_p = C_p + (1-n)C_{ps}$. It may be noted that with the equivalent circuit of FIG. 8, if one chooses $C_{ps}$ in accordance with Relation 1, i.e., $C_p = (n-1)C_{ps}$, the admittance of the first shunt branch vanishes and, consequently, all of the plate current from the switch tube 11 goes directly into the load which is a resistance-capacitance network. Therefore, no ringing will occur in the secondary voltage waveform for plate current waveforms that do not have any ringing current components.

Figure 9:
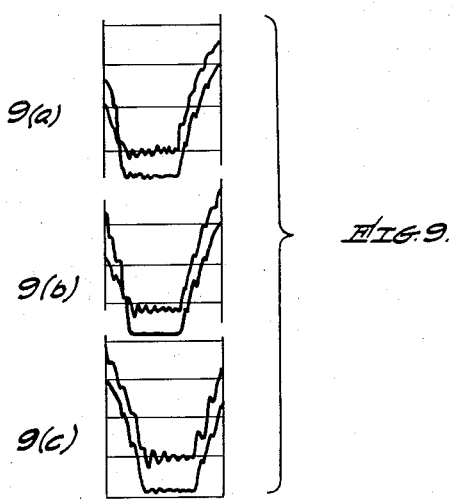
FIG. 9 illustrates additional waveforms of voltages in the apparatus of FIG. 1 when there is under-neuaralization, neutralization and over-neutralization in the secondary winding only.

FIG. 9a illustrates typical primary waveforms 80 and secondary waveforms 81 obtained when $C_{ps}$ is too small, i.e., $C_{ps}$ is less than $$\frac{C_p}{(n-1)}$$

In the above case, the transformer 16 is said to be under-neutralized.

FIG. 9b illsutrates a typical primary waveform 80 and secondary waveform 81 obtained when the neutralized condition is maintained, i.e., $$C_{ps} = \frac{C_p}{(n-1)}$$

FIG. 9c, on the other hand, illustrates typical primary waveforms 80 and secondary waveforms 81 obtained when the network is over-neutralized, i.e., $C_{ps}$ is greater than $$\frac{C_p}{(n-1)}$$

In the above circumstances, the primary waveform still exhibits a ring at an angular frequency $\omega_R$ where $$\omega_R = \frac{1}{\sqrt{nL_pC_{ps}}} \quad (2)$$

The transfer impedance of the neutralized network may be expressed as $$Z_{12} = \frac{E_o}{I_p} = \frac{1/n}{C_e\left(j\omega + \frac{1}{R_sC_e}\right)} \quad (3)$$

wherein:

$E_o$ is the voltage developed across the output load resistor, $R_s$;
$I_p$ is the current flowing into the circuit;

$C_e = \left(C_s + \frac{C_p}{n}\right)$ and $R_s$, as before, is the effective secondary load resistance presented by the traveling-wave tube 18 or other microwave device.

Inasmuch as the rise time is not directly a function of $C_{ps}$, it is desirable to reduce $C_s$ at the expense of $C_{ps}$. This may be accomplished by embedding the secondary windings 22, 23 between the two primary windings 20, 21 when constructing the pulse transformer 16. When embedded between the primary windings 20, 21 in this manner, the secondary transformer windings 22, 23 contribute capacitance basically to $C_{ps}$ and not to $C_s$. It should be noted, however, that capacitance cannot be destroyed and that any decrease in $C_s$ must necessarily have a corresponding increase in $C_p$. This is particularly advantageous in situations where the turns ratio, $n$, is substantially greater than unity, since $$C_e = \left(C_s + \frac{C_p}{n}\right)$$

Referring to FIGS. 2 and 3, there is shown, respectively, the voltage waveform 70 applied to the control grid 13 of the switch tube 11 and the waveform 74 applied to the cathode 38 of the traveling-wave tube 18 when a transformer of the type described in connection with FIGS. 4, 5 and 6 is employed. In particular, the waveform of FIG. 2 commences with a pulse 71, and is followed by a ramp voltage 72 to provide for such magnetizing current in the pulse transformer 16 as may be necessary to maintain the top of the pulse flat. The pulse 71, however, preferably contains sufficient charge to charge the capacitances of the circuit $C_p$, $C_{ps}$ and $C_s$ to the desired output voltage level. Also, in order to prevent ringing on the primary windings 20, 21, the width of the pulse 71 should be equal to an integral number times the period of the ringing frequency thereon. From Relation 2, the minimum pulse width to prevent ringing on the primary windings 20, 21 is $2\pi\sqrt{nL_pC_{ps}}$ seconds. A voltage waveform of the foregoing type may be realized, for example, by adding two or more waveforms together by employing conventional techniques. When the waveform of FIG. 2 is applied to the switch tube 11, a waveform 74 of the type shown in FIG. 3 is realized at the output of pulse transformer 16. As may be observed, the waveform 74 has a flat top 75 whereon the ring has been substantially eliminated. In all the foregoing cases some ringing remains on the trailing edge of the pulses. Such ringing on the trailing edge of the pulses does not have any detrimental effect on the functioning of the apparatus.

The above Relation 1 for neutralizing transformer 16 is valid for all instances where the turns ratio, $n$, is greater than unity. For instances where the turns ratio, $n$, is less than unity, it is necessary to interchange the effective capacitances to ground, $C_p$ and $C_s$, for the primary and the secondary windings in the above Relation 1. Lastly, it is also evident from Relation 1 that no neutralization can be achieved when the turns ratio, $n$, is equal to unity.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An apparatus for producing output pulses comprising pulse generator means for producing a waveform constituting a plurality of successive voltage pulses available at an output circuit, said output circuit having a first inherent distributed capacitance to ground; a utilization device having an input circuit adapted to be responsive to said waveform, said input circuit having a second inherent distributed capacitance to ground; a pulse transformer having a first winding connected to said output circuit of said pulse generator means and a second winding connected to said input circuit of said utilization device, said second winding having a number of turns that differs from the number of turns of said first winding and said first and second windings having third and fourth inherent effective capacitances to ground, respectively; and means for providing an effective capacitance between said first and second windings of a magnitude substantially equal to the sum of the capacitance to ground of the one winding of the first and second windings having the least number of turns and the capacitance to ground of the circuit to which said one winding is connected divided by the absolute value of the difference between the ratio of the number of turns in the remaining winding of said first and second windings to said one winding and one.

2. An apparatus for producing microwave output pulses comprising pulse generator means for producing a waveform constituting a plurality of successive voltage pulses, said waveform being available at an output circuit having a first inherent distributed capacitance to ground; a microwave utilization device adapted to be responsive to said waveform; a pulse transformer having a primary winding connected to said output circuit of said pulse generator means, and a secondary winding connected to said microwave utilization device, said primary winding having a second inherent effective capacitance to ground and the ratio of the number of turns in said secondary winding to the number of turns in said primary winding being greater than unity; and means for providing an effective capacitance between said primary and secondary windings of a magnitude substantially equal to the sum of said first and second capacitances divided by the absolute value of the difference between said ratio and one.

3. The apparatus for producing microwave output pulses as defined in claim 2 wherein said pulse transformer has an effective leakage inductance, $L_p$, as referenced to the primary side thereof and each successive voltage pulse of said waveform produced by said pulse generator means commences with a voltage spike of a duration equal to a positive integer no less than one times $2\pi\sqrt{nL_pC_{ps}}$ seconds, wherein $n$ is the ratio of the number of turns in said secondary winding to the number of turns in said primary winding, and $C_{ps}$ is the effective capaictance between said primary and secondary windings thereby to minimize ringing on the primary side of said pulse transformer.

4. In a microwave pulse generating apparatus, a pulse transformer having a primary winding adapted to be coupled to an input circuit for applying a train of input pulses thereto, and a secondary winding coupled to an output circuit, the ratio of the number of turns in said secondary winding to the number of turns in said primary winding being greater than unity, and said primary winding and said input circuit having a total effective capacitance to ground; and means for providing an effective capacitance between said primary and secondary windings substantially equal to said total effective capacitance to ground of said primary winding and said input circuit divided by the absolute value of the difference between said ratio and one.

5. The apparatus for producing microwave output pluses as defined in claim 2 wherein corresponding extremities of said primary and secondary windings are referenced to a substantially fixed reference potential level and said effective capacitance between said primary and secondary windings is in the range of from one-third to one-half the static capacitance therebetween.

6. The apparatus for producing microwave output pulses as defined in claim 5 wherein said effective capacitance between said primary and secondary windings is substantially equal to 0.4, the static capacitance therebetween.

7. The apparatus for producing microwave output pulses as defined in claim 2 wherein corresponding extremities of said primary and secondary windings are referenced to a substantially fixed reference potential level and said effective capacitance between said primary and secondary windings includes an external capacitor connected between the remaining extremities of said primary and secondary windings.

References Cited in the file of this patent

UNITED STATES PATENTS 2,841,655    Horowitz _____ July 1, 1958